US006970823B1

(12) United States Patent
Yago et al.

(10) Patent No.: US 6,970,823 B1
(45) Date of Patent: Nov. 29, 2005

(54) SYSTEM, METHOD AND COMPUTER PROGRAM PRODUCT FOR MONITORING VOICE APPLICATION CALLS OVER A NETWORK

(75) Inventors: Paul C. Yago, Santa Cruz, CA (US); Ravi Sangisetti, San Jose, CA (US); Kaiwang Zhang, Milpitas, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 759 days.

(21) Appl. No.: 10/017,264

(22) Filed: Dec. 14, 2001

(51) Int. Cl.[7] .................. G10L 21/00; G06F 15/173
(52) U.S. Cl. .................. 704/270; 709/223; 709/224
(58) Field of Search ................. 704/270, 270.1, 704/275, 500; 379/88.01, 88.14, 88.19; 709/223, 709/224

(56) References Cited

U.S. PATENT DOCUMENTS

| | | | |
|---|---|---|---|
| 5,323,452 A | 6/1994 | Dickman et al. | 379/201 |
| 5,519,830 A | 5/1996 | Opoczynski | 395/182.02 |
| 5,553,121 A * | 9/1996 | Martin et al. | 379/88.01 |
| 5,999,525 A | 12/1999 | Krishnaswamy et al. | 370/352 |
| 6,138,127 A | 10/2000 | Pasch | 707/206 |
| 6,192,255 B1 | 2/2001 | Lewis et al. | 455/558 |
| 6,195,116 B1 | 2/2001 | Lee | 348/15 |
| 6,208,642 B1 * | 3/2001 | Balachandran et al. | 370/385 |
| 6,266,700 B1 | 7/2001 | Baker et al. | 709/230 |
| 6,311,278 B1 | 10/2001 | Raanan et al. | 713/201 |
| 6,460,043 B1 * | 10/2002 | Tabbara et al. | 707/100 |
| 6,510,417 B1 * | 1/2003 | Woods | 704/275 |
| 6,604,139 B1 * | 8/2003 | Sajina et al. | 709/224 |
| 6,708,195 B1 * | 3/2004 | Borman et al. | 718/102 |
| 6,748,055 B1 * | 6/2004 | Borman et al. | 379/88.14 |
| 6,814,842 B1 * | 11/2004 | Yago et al. | 704/270.1 |
| 2001/0033650 A1 | 10/2001 | Wilson et al. | 379/398 |

FOREIGN PATENT DOCUMENTS

| | | | |
|---|---|---|---|
| EP | 0948164 A1 | 10/1999 | H04L 12/26 |
| WO | 98/03023 | 1/1998 | H04Q 3/00 |
| WO | 98/36559 | 8/1998 | H04N 5/262 |
| WO | 99/19803 | 4/1999 | G06F 13/00 |

* cited by examiner

Primary Examiner—Susan McFadden
(74) Attorney, Agent, or Firm—Zilka-Kotab, PC; Christopher J. Hamaty (57) ABSTRACT

A system, method and computer program product are provided for monitoring voice application calls over a network. Initially, a first leg of a voice application call is identified. Next, a unique key is created based on the first leg of the voice application call utilizing a first session object. Further, a second leg of the voice application call is identified. Another unique key is created based on the second leg of the voice application call utilizing a second session object. In use, both the first and second session objects are associated with a single application object.

31 Claims, 7 Drawing Sheets

CallingPartyName[]
CallingParty[] (port number)
CalledPartyName[]
CalledParty[] (port number)
NSCCPIncremental – Sniffer administered member

SYSTEM, METHOD AND COMPUTER PROGRAM PRODUCT FOR MONITORING VOICE APPLICATION CALLS OVER A NETWORK

FIELD OF THE INVENTION

The present invention relates to network analysis, and more particularly to analyzing Voice over Internet Protocol (VoIP) calls.

BACKGROUND OF THE INVENTION

Voice signals are transmitted over a packet network by first formatting the voice signal data stream into multiple discrete packets. In a Voice Over Internet Protocol (VoIP) call, an originating voice gateway quantizes an input audio stream into packets that are placed onto a packet network and routed to a destination voice gateway. The destination voice gateway decodes the packets back into a continuous digital audio stream that resembles the input audio stream. As an option, a compression or decompression algorithm may be used on the quantized digital audio stream to reduce the communication bandwidth required for transmitting the audio packets over the network.

Figure 1:
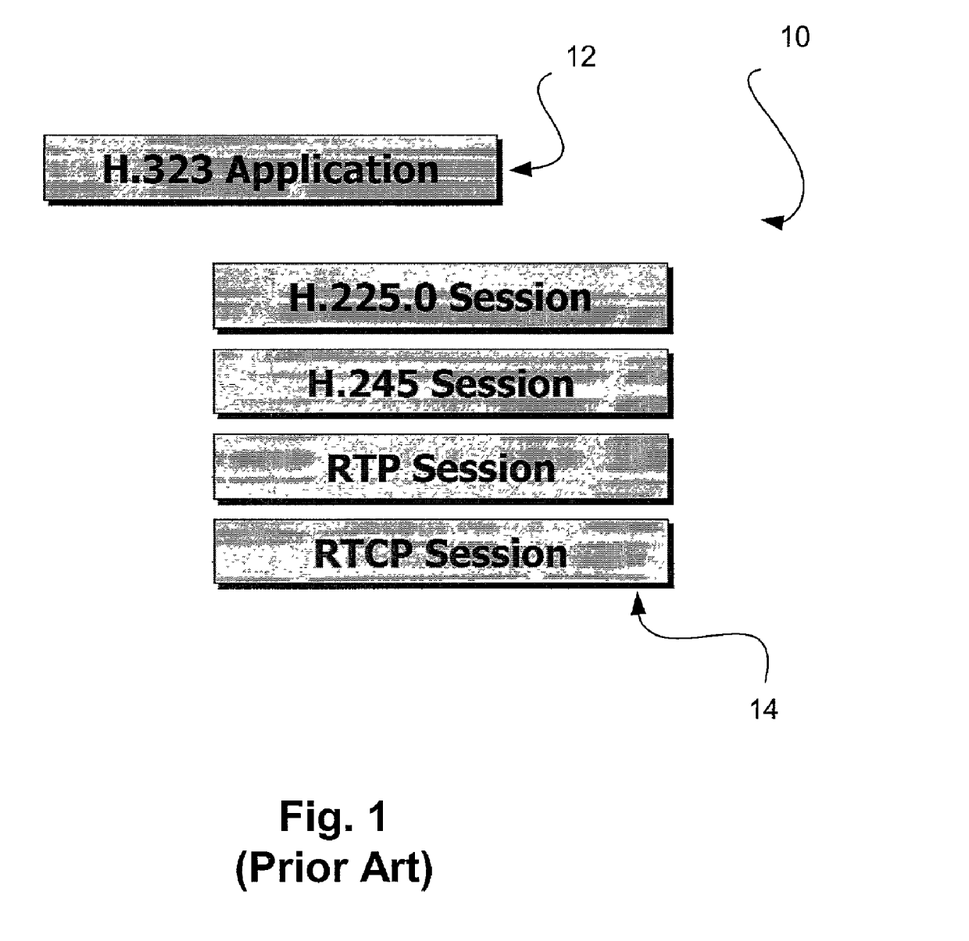
FIG. 1 illustrates exemplary protocol layers associated with Voice over Internet Protocol (VoIP) calls.

Similar to conventional Internet Protocol, VoIP includes a plurality of layers. Prior Art FIG. 1 illustrates a plurality of exemplary well known layers 10 associated with VoIP. As shown, such layers include at least one application layer 12 and a plurality of session layers 14 positioned below the application layer 12. While not shown, at least one connection layer may be positioned below the session layer. By way of example, the application layer 12 may include H.323. H.323 is a standard approved by the International Telecommunication Union (ITU) in 1996 to promote compatibility in videoconference transmissions over IP networks. Further included as session layers are H.225.0, H.245, real-time transport protocol (RTP), and real-time transport control protocol (RTCP). It should be noted that VoIP calls can employ various protocols for communication purposes.

The Quality of Service (QoS) of VoIP calls can degrade due to congestion on the packet network or failure of network processing nodes in the packet network. Quality of service can include anything from call sound quality to the ability and responsiveness of the VoIP network in establishing new VoIP calls. IP network reliability has not been proven to be in the same class as a traditional switched Public Services Telephone Network (PSTN).

Due to a need to understand, troubleshoot and optimize a particular network to improve VoIP calls, there is an ongoing desire for traditional network assessment tools to be tailored to monitor network parameters specific to VoIP calls. Network assessment tools referred to as "analyzers" are often relied upon to analyze networks communications at a plurality of layers. One example of such analyzers is the SNIFFER ANALYZER™ device manufactured by NETWORK ASSOCIATES, INC™. Analyzers have similar objectives such as determining why network performance is slow, understanding the specifics about excessive traffic, and/or gaining visibility into various parts of the network.

As mentioned earlier, network analyzers collect information at a plurality of layers. Each set of layer-specific data is conventionally stored in a buffer "object" by the network analyzer. In particular, a session object, an application object, etc. are each used to store network traffic information at session and application layers, respectively.

In use, session objects are traditionally created for each portion of a VoIP call between an endpoint and the call manager. Each of such portions of the VoIP call is traditionally known as a "leg." It should be noted that there are traditionally at least two legs per VoIP call, where users communicate from a pair of endpoints by way of a call manager.

As mentioned hereinabove, a session object is created for each leg of a VoIP call between an endpoint and the call manager. In the prior art, a separate application object is also stored for each leg of the VoIP call. Unfortunately, such arrangement makes it more difficult to monitor and analyze VoIP call traffic, since the number of application objects may grow at a rate similar to the session objects.

For example, in a "tree representation" where a plurality of session objects are associated with a single application object in order to more efficiently organize the objects, the prior art method would result in an unmanageable number of "nodes" (i.e. separate trees) since only one session object would be associated with each application object. Thus, any conventional advantages associated with a "tree representation" would not be realized.

There is thus a need for a better way to organize data relating to VoIP call traffic to facilitate understanding, troubleshooting, and optimizing a particular network to improve VoIP calls.

DISCLOSURE OF THE INVENTION

A system, method and computer program product are provided for monitoring voice application calls over a network. Initially, a first leg of a voice application call is identified. Next, a unique key is created based on the first leg of the voice application call utilizing a first session object. Further, a second leg of the voice application call is identified. Another unique key is created based on the second leg of the voice application call utilizing a second session object. In use, both the first and second session objects are associated with a single application object.

In one embodiment, each leg of the voice application call may take place between an end point and a call manager. Further, each unique key associated with the session objects may be created utilizing port numbers associated with the end point and the call manager.

In another embodiment, each leg of the voice application calls may be identified upon receipt of a message. Such message may include a station call information message. Moreover, the message may include a plurality of fields. Optionally, the message may include a calling party name field, a calling party port number field, a called party name field, and a called party port number field.

As an option, another unique key associated with the application object may be created. Such unique key associated with the application object may be created based on the fields for identification purposes.

In still yet another embodiment, the completion of the voice application call may be identified. Such completion of the voice application call may be identified upon receipt of a completion message. Further, the completion message may include a station on hook message and/or a station stop media transmission message. As an option, an index variable may be incremented upon the receipt of the completion message.

BRIEF DESCRIPTION OF THE DRAWINGS

Prior art

DESCRIPTION OF THE PREFERRED EMBODIMENTS

Figure 1A:
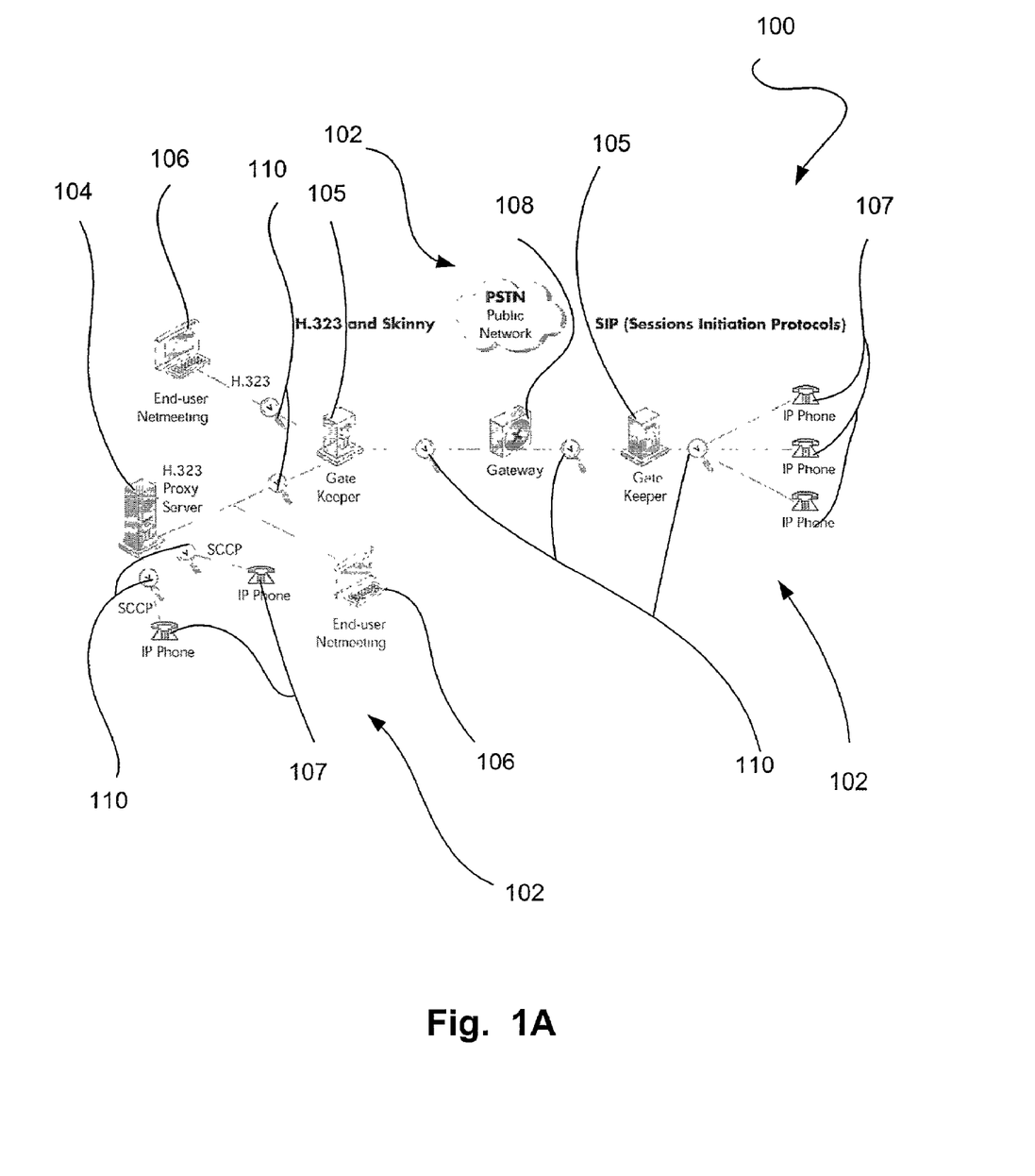
FIG. 1A illustrates an exemplary network architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a public switched telephone network (PSTN), a wide area network (WAN) such as the Internet, etc.

Coupled to the networks 102 are servers 104 and gatekeepers 105 which are capable of communicating over the networks 102. Also coupled to the networks 102 and the servers 104 is a plurality of end user devices 106. In the context of the present description, such end user devices 106 may include a web server, desktop computer, lap-top computer, hand-held computer, or any other type of hardware/software.

Also included is a plurality of Internet Protocol (IP) telephones 107 coupled to the various servers 104 and end user devices 106. In use, the IP telephones 107 are adapted for communicating via the networks 102 utilizing IP. It should be noted that the IP telephones 107 may be operated in accordance with any desired protocol 20 including, but not limited to H.323, H.248, session initiation protocol (SIP), skinny client control protocol (SCCP), or any other desired protocol capable of handling VoIP. It should be noted that any type of skinny protocol other than SCCP may be used per the desires of the user. Further, skinny and non-skinny protocols may be used together.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Resident on any of the foregoing components and/or network segments may be a network assessment tool such as a network analyzer 110. Each network analyzer 110 may be relied upon to analyze networks communications at a plurality of layers. One example of such analyzer 110 is the SNIFFER ANALYZER™ device manufactured by NETWORK ASSOCIATES, INC™. In use, the analyzer 110 may collect information for the purpose of determining why network performance is slow, understanding the specifics about excessive traffic, and/or gaining visibility into various parts of the network.

In use, the network analyzers 110 are capable of monitoring voice application calls over a network. Initially, a first leg of a voice application call is identified. Next, a unique key is created based on the first leg of the voice application call utilizing a first session object. Further, a second leg of the voice application call is identified. Another unique key is created based on the second leg of the voice application call utilizing a second session object. In use, both the first and second session objects are associated with a single application object. More information relating to a more specific embodiment will be set forth hereinafter.

By this design, a minimum amount of voice application call objects are generated. This improves the manner in which the objects may be stored and organized, and the data associated with such objects may be analyzed. More information relating to the benefits of such technique will be set forth hereinafter in greater detail.

Figure 2:
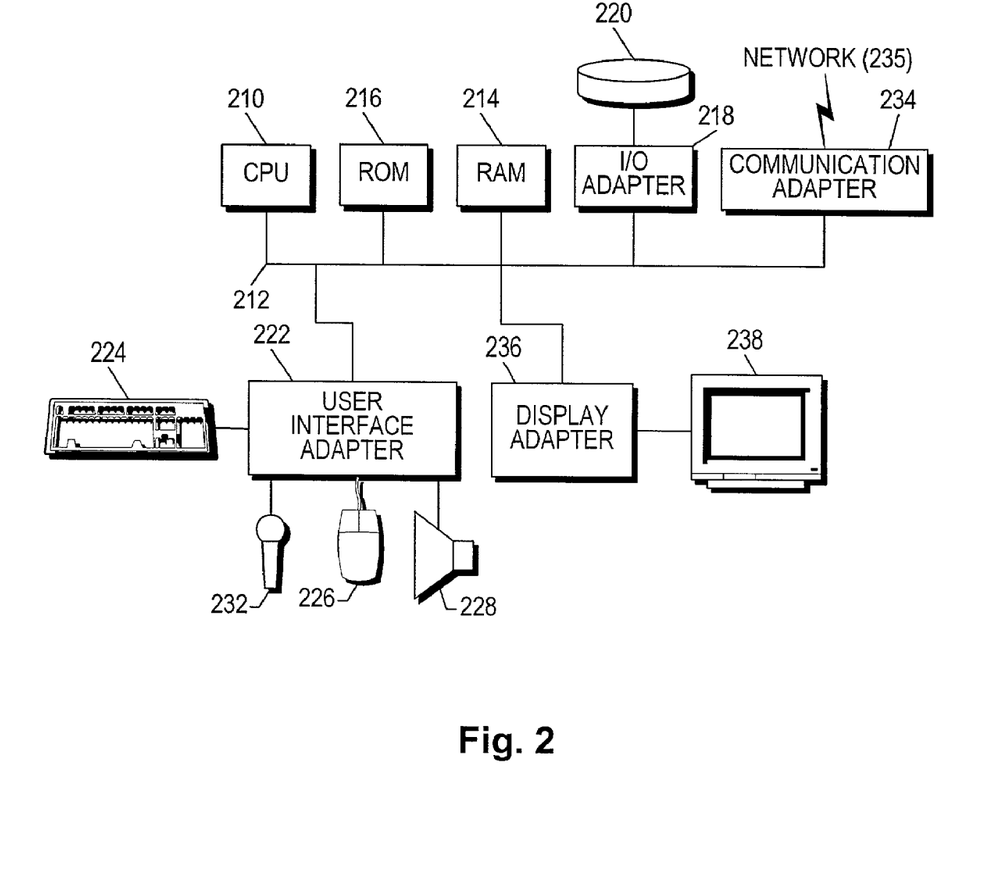
FIG. 2 shows a representative hardware environment that may be associated with the data servers and user devices of FIG. 1A, in accordance with one embodiment.

FIG. 2 shows a representative hardware environment that may be associated with the data servers 104 and/or end user computers 106 of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
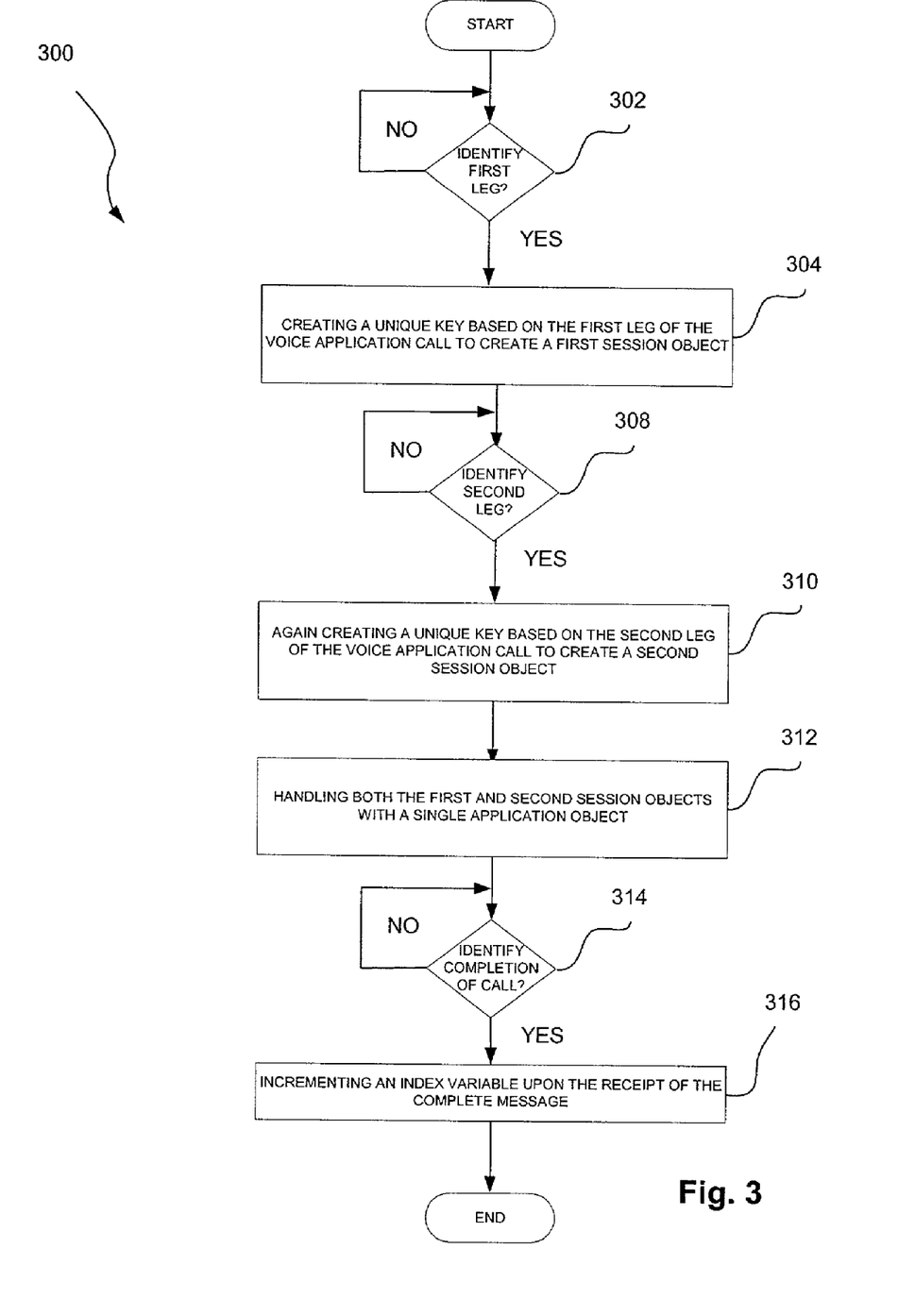
FIG. 3 illustrates a method for monitoring voice application calls over a network, in accordance with one embodiment.

FIG. 3 illustrates a method 300 for monitoring voice application calls over a network, in accordance with one embodiment. As an option, the present method 300 may be used in the context of a network analyzer like that mentioned during reference to FIG. 1. Of course, the present techniques may be utilized in any desired context and environment.

Initially, in decision 302, a first leg of a voice application call is identified. In the context of the present description, a voice application call may include any network communication involving Voice over Internet Protocol (VoIP) or other voice-based IP protocols, and/or any type of voice call capable of being made over a packet-switched network. Further, the first leg may include a portion of the voice application call between a source (i.e. end point) and a destination (i.e. call manager) or between any two distinct locations on a network. Moreover, the first leg may include any particular portion of the voice application call. More information relating to an embodiment involving the end point and the call manager will be set forth during an example set forth in FIG. 5.

Figure 4:
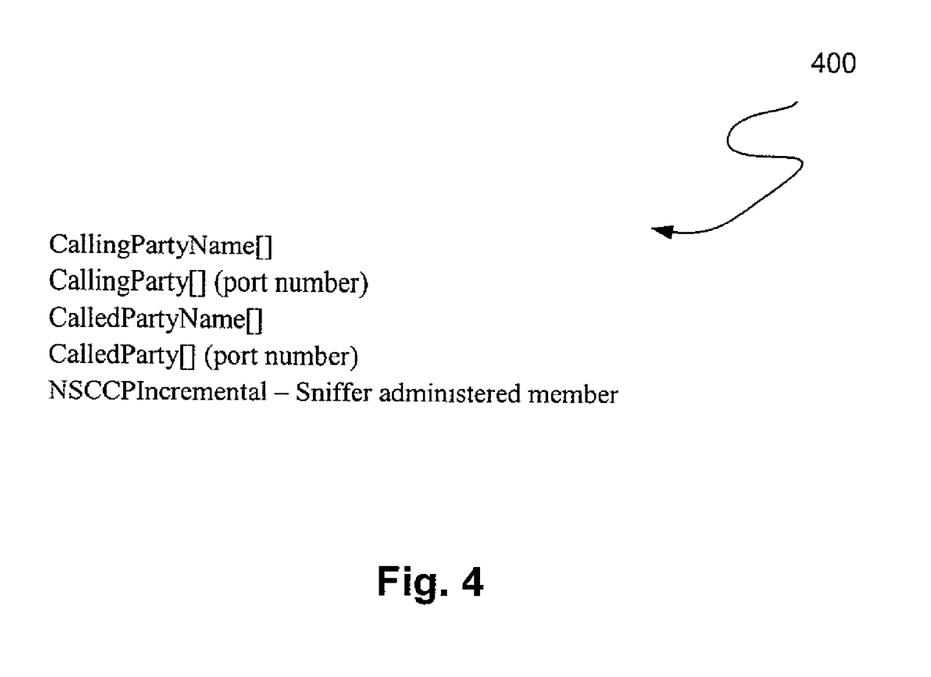
FIG. 4 illustrates the fields that may be included with the message that identifies the legs of the voice application call.

Optionally, the first leg of the voice application call may be identified upon receipt of a message. Such message may include a station call information message. Moreover, the message may include a plurality of fields. Optionally, the message may include a calling party name field, a calling party port number field, a called party name field, and a called party port number field. FIG. 4 illustrates the fields 400 that may be included with the message that identifies the legs of the voice application call. Of course, any other way of identifying the first leg of the voice application call may be employed.

Upon the first leg of the voice application call being identified in decision 302, a unique key is created based on the first leg of the voice application call utilizing a first session object. See operation 304. In the context of the present description, an object (i.e. session object) may refer to a buffer, memory, table or any other set of data that is associated with a specific communication protocol layer (i.e. connection, session, application, etc.). Of course, various other layers may be represented by other objects. It should be noted that the present session object may be identified and differentiated from other session objects utilizing the unique key.

In one embodiment, the unique key may be created utilizing a first port number associated with a source (i.e. end point) of the first leg of the voice application call and a second port number associated with a destination (i.e. call manager) of the first leg of the voice application call.

As an option, the unique key may be created by combining the first and second port numbers by any desired formula. In one embodiment, the key may include a first portion consisting of the first port number and a subsequent second portion consisting of the second port number. It should be noted, however, that the key may refer to any identifier that is capable of differentiating the session object of the first leg of the voice application call from the session object of other legs.

Next, in decision 308, a second leg of the voice application call is identified. Similar to the first leg, the second leg of the voice application call may be identified based on a message (i.e. station call information message) with a plurality of fields. Note again FIG. 4. Of course, any other way of identifying the second leg of the voice application call may be employed.

Further, another unique key is created based on the second leg of the voice application call utilizing a second session object. See operation 310. Again, the second session object may refer to a buffer, memory, table or any other set of data that is associated with the session protocol layer, and may be identified and differentiated from other session objects utilizing the unique key.

In one embodiment, the second unique key may be created utilizing a first port number associated with a source of the second leg of the voice application call and a second port number associated with a destination of the second leg of the voice application call. Further, the key may refer to any identifier that is capable of differentiating the session object of the second leg of the voice application call from the session object of other legs.

In operation 312, both the first and second session objects are associated with a single application object. This may be accomplished by utilizing pointers or any other mechanism capable of "linking" or associating the first and second session objects with the single application object. This association may be valuable for organizing the session objects in a more compact form. For example, the first and second session objects associated with the single application object may be organized in a tree representation.

More information relating to such tree representation may be found with reference to a co-pending application entitled "SYSTEM AND METHOD FOR ORGANIZING OBJECTS OF A VOICE CALL IN A TREE REPRESENTATION" which was filed concurrently herewith under Ser. No. 10/017,856 and issued under U.S. Pat. No. 6,814,842, with the same inventor(s), and which is incorporated herein by reference in its entirety.

In the prior art, an application object was created for each session object associated with a particular leg of a voice application. This, in turn, resulted in a vast number of application objects which were difficult to organize and manage. By handing the first and second session objects (associated with separate legs of a voice application call) with a single application object, the number of overall application objects is reduced and effective analysis is facilitated.

As an option, another unique key associated with the application object may be created. Such unique key associated with the application object may be created based on the fields of the aforementioned messages that initiate the legs of the voice application call. As an option, the application object key may be created by a combination of the fields of the aforementioned messages. Note again FIG. 4.

Next, in decision 314, the completion of the voice application call may be identified. This may be accomplished by any desired signal. For example, such completion of the voice application call may be identified upon receipt of a completion message. As an option, the completion message may include a station on hook message and/or a station stop media transmission message.

Once the completion of the voice application call is identified, an index variable may be incremented. Note operation 316. This index variable may be utilized for differentiating the current voice application call from other previous and subsequent voice application calls involving the same sources (i.e. end points) and destinations (i.e. call managers). This way, the index variable may be employed to differentiate each object.

Figure 5:
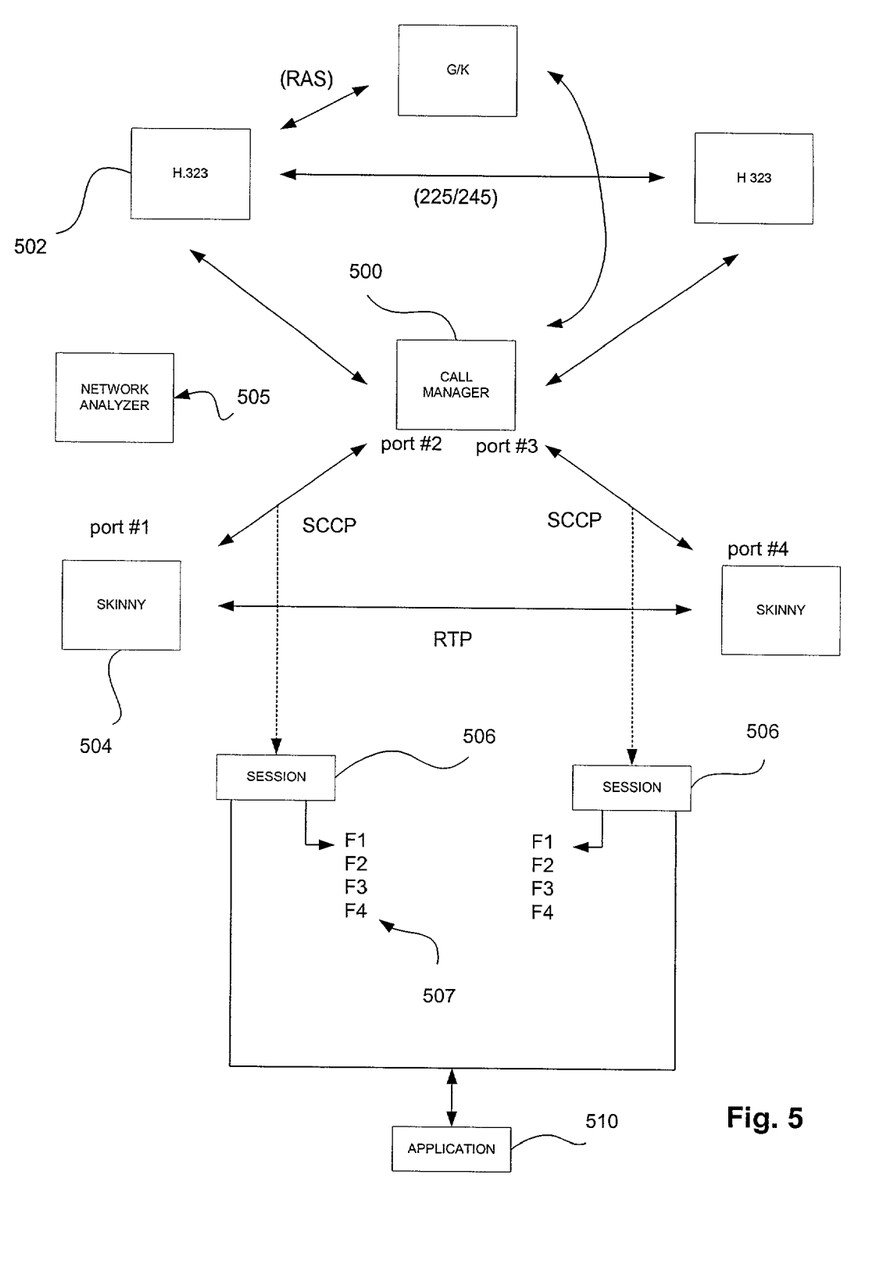
FIG. 5 illustrates an exemplary application of the principles set forth in the method of FIG. 3, in accordance with one specific embodiment.

FIG. 5 illustrates an exemplary application of the principles set forth in the method 300 of FIG. 3, in accordance with one specific embodiment. It should be noted that the present example is set forth for illustrative purposes only, and should not be construed as limiting in any manner.

As shown, a call manager 500 is provided which is capable of handling voice application calls employing a plurality of different voice protocols. For example, the call manager 500 may communicate with a pair of IP telephones 502 capable of communicating utilizing H.323 protocol. Further, the call manager 500 may communicate with another pair of IP telephones 504 capable of communicating utilizing SCCP protocol. Such IP telephones 504 are often referred to as "skinny" IP telephones 504 since the SCCP protocol allows for the IP telephones 504 to operate as very thin-clients. A network analyzer 505 is included for monitoring the interaction between the IP telephones 504 and the call manager 500.

As shown, at the beginning of a call, a session object 506 is created for each leg of the call (end-point to/from call manager) and the associated message 507 is appended to the session object 506. Further, a key may be used to differentiate each of the session objects 506, as set forth earlier.

These session objects 506 then parse and analyze each message 507 as it arrives. If a session object 506 receives a station call information message, it uses the fields (i.e. F1, F2, F3, F4, etc.) of the message 507 (See FIG. 4) to build a key.

Such key may, in turn, be used to create and uniquely identify an application object 510. Since the fields are the same for all legs of the voice application call and unique from all other voice application calls, they uniquely key the application object 510. When the second leg of the voice application call receives the station call information message (both legs receive this message), the abovementioned key is created and refers to the same application object 510. At some point after the application object 510 is created, the messages which were stored in the session objects 506 are moved up to the application object 510 into a sorted call flow list. Therefore, the call flow in the application object 510 contains the session objects 506 of both legs of the voice application call.

When messages are received which indicate that the call is complete (i.e. Station On Hook, Station Stop Media Xmission), the aforementioned index variable is incremented so that any subsequent session objects 506 with the same ports do not reference this same application object 510.

By this design, one application object 510 is generated per call. This technique is accomplished using message-based logic.

Figure 6:
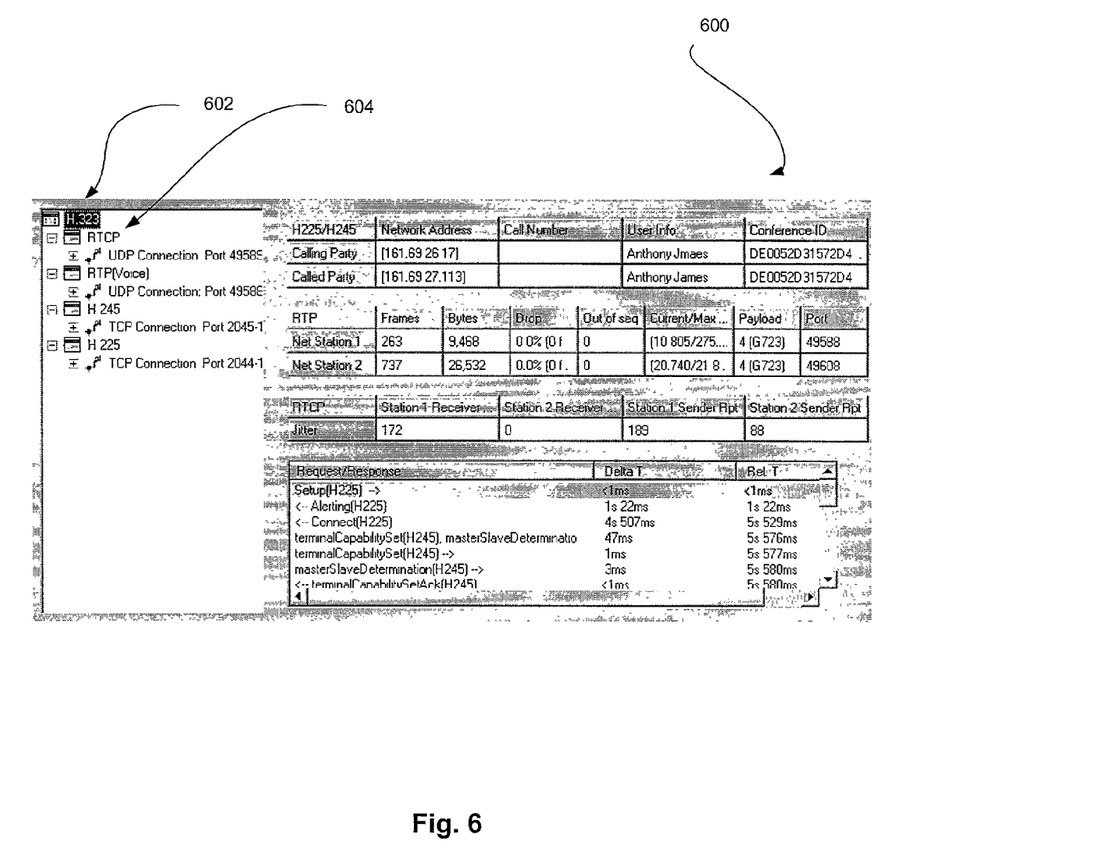
FIG. 6 illustrates the manner in which generating one application object per call affords improved reporting and analysis, in accordance with one embodiment.

FIG. 6 illustrates the manner in which generating one application object per call affords improved reporting and analysis, in accordance with one embodiment. As shown, a reporting interface 600 is provided which displays at least one application object 602. Associated with such application object 602 is a plurality of session objects 604. By minimizing the number of application objects 602 and consolidating the session objects 604 under a single application object 602, the organizational structure is advantageously compacted. This efficient minimization of the organization structure allows a user to more effectively locate objects associated with a particular voice application for analysis purposes. The present example of such organization is an optional tree representation. Of course, any desired representation may be provided per the desires of the user.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for monitoring voice application calls over a network, comprising:
   (a) identifying a first leg of a voice application call;
   (b) creating a unique key based on the first leg of the voice application call utilizing a first session object;
   (c) identifying a second leg of the voice application call;
   (d) creating another unique key based on the second leg of the voice application call utilizing a second session object; and
   (e) associating both the first and second session objects with a single application object;
   wherein the voice application calls are more easily monitored utilizing a graphical user interface by reducing a number of the application objects displayed on the graphical user interface, thereby displaying a compacted organizational structure including the single application object for being more easily monitored visually by a user.

2. The method as recited in claim 1, wherein each leg of the voice application call takes place between an end point and a call manager.

3. The method as recited in claim 2, wherein each unique key associated with the session objects is created utilizing port numbers associated with the end point and the call manager.

4. The method as recited in claim 2, wherein each leg of the voice application calls is identified upon receipt of a message.

5. The method as recited in claim 4, wherein the message includes a station call information message.

6. The method as recited in claim 4, wherein the message includes a plurality of fields.

7. The method as recited in claim 6, and further comprising creating another unique key associated with the application object.

8. The method as recited in claim 7, wherein the unique key associated with the application object is created based on the fields.

9. The method as recited in claim 6, wherein the message includes a calling party name field, a calling party port number field, a called party name field, and a called party port number field.

10. The method as recited in claim 1, and further comprising identifying the completion of the voice application call.

11. The method as recited in claim 10, wherein the completion of the voice application call is identified upon receipt of a completion message.

12. The method as recited in claim 11, wherein the completion message is selected from the group consisting of a station on hook message and a station stop media transmission message.

13. A computer program product embodied on a computer readable medium for monitoring voice application calls over a network, comprising:
   (a) computer code for identifying a first leg of a voice application call;
   (b) computer code for creating a unique key based on the first leg of the voice application call utilizing a first session object;
   (c) computer code for identifying a second leg of the voice application call;
   (d) computer code for creating another unique key based on the second leg of the voice application call utilizing a second session object; and
   (e) computer code for associating both the first and second session objects with a single application object;
   wherein the voice application calls are more easily monitored utilizing a graphical user interface by reducing a number of the application objects displayed on the graphical user interface, thereby displaying a compacted organizational structure including the single application object for being more easily monitored visually by a user.

14. The computer program product as recited in claim 13, wherein each leg of the voice application call takes place between an end point and a call manager.

15. The computer program product as recited in claim 14, wherein each unique key associated with the session objects is created utilizing port numbers.

16. The computer program product as recited in claim 14, wherein each unique key associated with the session objects is created utilizing port numbers associated with the end point and the call manager.

17. The computer program product as recited in claim 14, wherein each leg of the voice application calls is identified upon receipt of a message.

18. The computer program product as recited in claim 17, wherein the message includes a station call information message.

19. The computer program product as recited in claim 17, wherein the message includes a plurality of fields.

20. The computer program product as recited in claim 19, and further comprising computer code for creating another unique key associated with the application object.

21. The computer program product as recited in claim 20, wherein the unique key associated with the application object is created based on the fields.

22. The computer program product as recited in claim 19, wherein the message includes a calling party name field, a calling party port number field, a called party name field, and a called party port number field.

23. The computer program product as recited in claim 13, and further comprising computer code for identifying the completion of the voice application call.

24. The computer program product as recited in claim 23, wherein the completion of the voice application call is identified upon receipt of a completion message.

25. The computer program product as recited in claim 24, wherein the completion message is selected from the group consisting of a station on hook message and a station stop media transmission message.

26. The computer program product as recited in claim 23, and further comprising computer code for incrementing an index variable upon the receipt of the completion message.

27. A system for monitoring voice application calls over a network, comprising:
 a processor including:
 (a) logic for identifying a first leg of a voice application call;
 (b) logic for creating a unique key based on the first leg of the voice application call utilizing a first session object;
 (c) logic for identifying a second leg of the voice application call;
 (d) logic for creating another unique key based on the second leg of the voice application call utilizing a second session object; and
 (e) logic for associating both the first and second session objects with a single application object;
 wherein the voice application calls are more easily monitored utilizing a graphical user interface by reducing a number of the application objects displayed on the graphical user interface, thereby displaying a compacted organizational structure including the single application object for being more easily monitored visually by a user.

28. A system for monitoring voice application calls over a network, comprising:
 a network analyzer including:
 (a) means for identifying a first leg of a voice application call;
 (b) means for creating a unique key based on the first leg of the voice application call utilizing a first session object;
 (c) means for identifying a second leg of the voice application call;
 (d) means for creating another unique key based on the second leg of the voice application call utilizing a second session object; and
 (e) means for associating both the first and second session objects with a single application object;
 wherein the voice application calls are more easily monitored utilizing a graphical user interface by reducing a number of the application objects displayed on the graphical user interface, thereby displaying a compacted organizational structure including the single application object for being more easily monitored visually by a user.

29. A method for monitoring voice application calls over a network, comprising:
 (a) identifying a plurality of legs of a voice application call each with a session object associated therewith;
 (b) creating a single application object; and
 (c) handling the session objects associated with the legs of the voice application call with the single application object;
 wherein the voice application calls are more easily monitored utilizing a graphical user interface by reducing a number of the application objects displayed on the graphical user interface, thereby displaying a compacted organizational structure including the single application object for being more easily monitored visually by a user.

30. A data structure embodied on a computer readable medium for monitoring voice application calls over a network, comprising an application object adapted for handling two legs of a voice application call; wherein the voice application calls are more easily monitored utilizing a graphical user interface by reducing a number of the application objects displayed on the graphical user interface, thereby displaying a compacted organizational structure including the single application object for being more easily monitored visually by a user.

31. A method for monitoring voice application calls over a network, comprising:
 (a) receiving a first message including a plurality of fields;
 (b) identifying a first leg of a voice application call between a first end point and a call manager involving a first Internet Protocol (IP) telephone utilizing a skinny client control protocol (SCCP), in response to the first message;
 (c) creating a unique key based on the first leg of the voice application call utilizing a first session object, wherein the unique key is created based on port numbers of the first end point and the call manager;
 (d) receiving a second message including a plurality of fields;
 (e) identifying a second leg of the voice application call between a second end point and the call manager involving a second Internet Protocol (IP) telephone utilizing SCCP, in response to the second message;
 (f) creating another unique key based on the second leg of the voice application call utilizing a second session object, wherein the another unique key is created based on port numbers of the second end point and the call manager;

(g) associating both the first and second session objects with a single application object;

(h) creating another unique key based on the fields of the first message and the fields of the second message for identifying the single application object;

(i) identifying the completion of the voice application call upon the receipt of a completion message; and (j) incrementing an index variable upon the receipt of the completion message;

wherein the voice application calls are more easily monitored utilizing a graphical user interface by reducing a number of the application objects displayed on the graphical user interface, thereby displaying a compacted organizational structure including the single application object for being more easily monitored visually by a user.

* * * * *